(No Model.)

H. M. GABEL.
MIXING OR SEPARATING MACHINE.

No. 478,587. Patented July 12, 1892.

Witnesses:
M. S. Belden
P. P. Sheehan

Henry M. Gabel
Inventor
by James W. See.
Attorney

THE NORRIS PETERS CO., PHOTO-LITHO., WASHINGTON, D. C.

UNITED STATES PATENT OFFICE.

HENRY M. GABEL, OF AVONDALE, OHIO.

MIXING OR SEPARATING MACHINE.

SPECIFICATION forming part of Letters Patent No. 478,587, dated July 12, 1892.

Application filed March 21, 1892. Serial No. 425,704. (No model.)

*To all whom it may concern:*

Be it known that I, HENRY M. GABEL, of Avondale, Hamilton county, Ohio, have invented certain new and useful Improvements in Mixing or Separating Machines, of which the following is a specification.

This invention pertains to improvements in machinery for mixing liquid and semi-liquid substances or for separating liquids from heavier semi-liquid substances.

The machine will be found extremely useful in dealing with lead pulp from which it is desired to remove the water and substitute oil and work the oil and lead well together.

The machine will also be found useful for analogous operations on other materials.

My invention will be readily understood from the following description, taken in connection with the accompanying drawings, in which—

Figure 1:
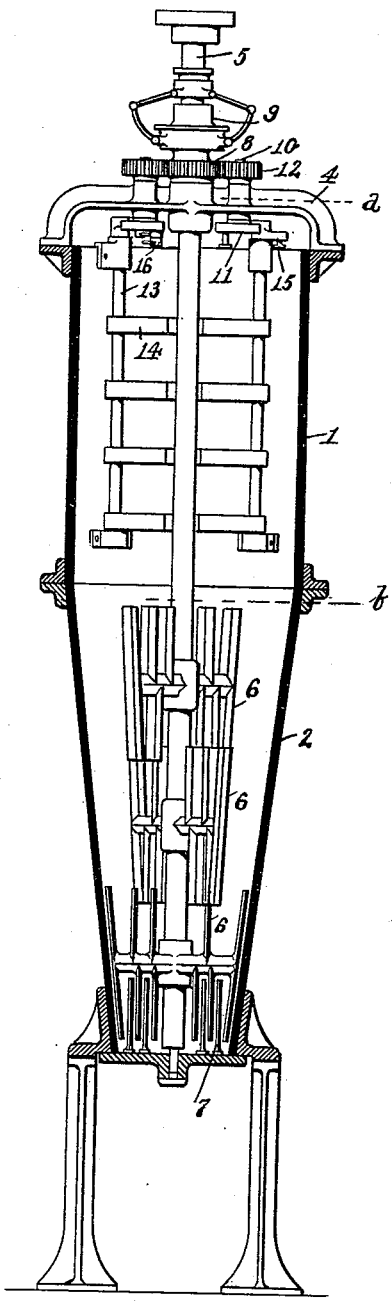
Figure 2:
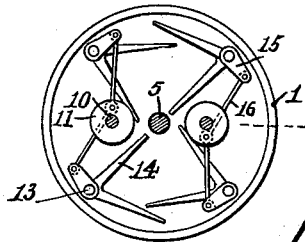
Figure 3:
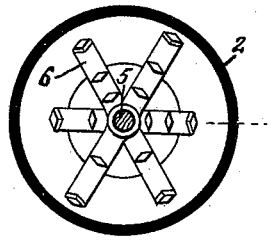
Figure 4:
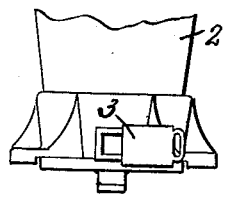

Figure 1 is a vertical diametrical section of a machine exemplifying my invention; Fig. 2, a plan thereof with much of the top work removed, the crank-shafts appearing in section in the plane of line *a*; Fig. 3, a horizontal section in the plane of line *b*; and Fig. 4, a side elevation at the base, showing the outlet-gate.

In the drawings, 1 indicates a vertical cylindrical shell open at its top; 2, a downward prolongation of the shell, this lower portion of the shell decreasing in diameter downwardly and being closed at its lower end; 3, an outlet-gate at the lower end of the shell; 4, a housing at the top of the shell; 5, a main shaft axially disposed in the shell and journaled in the housing and in the floor of the shell and adapted to be driven by power; 6, a series of rakes secured upon the shaft in the tapering portion of the shell, the rakes being arranged in vertical series, each rake being provided with vertical teeth of diamond-shaped horizontal section, the teeth of each rake projecting upwardly and downwardly from a centrally-disposed rake-arm, each rake containing a diametrical series of teeth, the several rakes being set at angles, as seen in Fig. 3, so that one half of each rake is about thirty degrees in angular advance of the corresponding half of the rake next below it, the outer teeth of the rakes swinging fairly close to the tapering shell, the lower teeth of the lower rake working near the floor of the shell, while the teeth of the rake next above come somewhat below the upper ends of the teeth of the rake below; 7, stationary teeth projecting rigidly upward from the floor of the shell in position to be passed between by the lower teeth of the lower rake; 8, a spur-gear loose on the central shaft above the top housing; 9, a clutch connecting the central shaft with the gear 8 and serving as means by which as the shaft rotates the gear may be caused to rotate with the shaft or to remain at rest, as desired; 10, two crank-shafts journaled vertically in the housing on opposite sides of the central shaft; 11, cranks upon the lower ends of these crank-shafts; 12, gears fast upon the upper ends of these crank-shafts and gearing with the central gear 8; 13, agitator-shafts journaled in boxes in the cylindrical portion of the shell and disposed close to and equidistant around the shell and extending about the length of the cylindrical shell; 14, horizontal agitator-arms secured to these shafts, each shaft carrying several of these arms distributed vertically and each arm being double, as seen in Fig. 2, the two members of each arm forming an angle of about ninety degrees; 15, a crank-arm fast on the upper end of each agitator-shaft, and 16 links, one for each agitator-shaft, connecting the crank-arms with the cranks, each crank being thus connected by link with the two nearer crank-arms. The rakes will turn so long as the main shaft rotates, and the cranks will turn so long as the central gear is clutched to the running main shaft and will remain stationary when the gear is unclutched. As the cranks revolve the agitator-arms vibrate, moving from near the shell inwardly to near the shaft and back, the contiguous arms of two agitators moving in fairly-close companionship. Assuming the shell to be full of material—as, for instance, lead pulp and oil—and the rakes and agitators in motion, the material in the cylindrical part of the shell will be thoroughly agitated and the oil be given a good opportunity to make contact with each particle of lead and displace the water from contact therewith. Then, the agitators being stopped, the stationary mass may settle, the light water going to the top, from whence it may be pumped off, and the lead and oil settling down and becoming subjected to the mash-like action of the rakes, which gives the finish to the material, the final action at the base of the shell being on the material where concentrated by the taper of the shell and held under the pressure due to the high head of material in the column above. After the proper settling in the upper portion of apparatus more pulp and oil may be charged and the agitators again started into motion and stopped when the agitation is complete, the rakes meanwhile thoroughly milling the material in the lower portion of the shell, and the finished product may discharge at the gate at any rate found expedient. Therefore the operation, while involving certain elements of intermittency, is practically continuous, the finished product flowing continuously from the gate, while raw charges are being fed into and water withdrawn from the top of the apparatus intermittently, the agitators working only between the settling periods.

I claim as my invention—

1. The combination, substantially as set forth, of a fixed shell, a circumferential series of shafts therein at the inner surface of the shell, agitator-arms secured upon the shafts and reaching to near the center of the shell and adapted for vibration to and from the shell, and mechanism, substantially as described, for giving to said shafts in unison motions of partial rotation, whereby said agitator-arm may be continuously oscillated.

2. The combination, substantially as set forth, of a fixed shell, a circumferential series of shafts therein at the inner surface of the shell, agitator-arms secured upon said shafts and reaching to near the center of the shell and adapted for vibration to and from the shell, crank-arms on said shafts, a central shaft, a gear thereon, crank-shafts provided with cranks and with gears engaging said central gear, and links connecting the cranks and crank-arms.

3. The combination, substantially as set forth, of a shell, a central shaft therein, rakes secured to a portion of said shaft in the lower portion of the shell, a circumferential series of agitator-shafts mounted in fixed bearings in the upper portion of the shell and provided with agitator-arms adapted to vibrate to and from the shell, and mechanism, substantially as described, for rotating the central shaft and oscillating the agitator-arms.

4. The combination, substantially as set forth, of a vertical shell cylindical in its upper portion and tapering in its lower portion to form a contracted base, a circumferential series of agitators in the cylindrical portion of the shell, and a rake-shaft and rake concentrically disposed in the tapering portion of the shell, whereby the agitators act on a large body of material and the rake acts on a smaller but denser body of the material.

5. The combination, substantially as set forth, of a shell, a central shaft therein, a horizontal diametrically-disposed rake-arm secured to the shaft and provided with vertical teeth, and a similar rake-arm secured to the shaft over the first one and set at an angular advance thereto and provided with teeth projecting below the upper ends of the teeth of the lower rake.

HENRY M. GABEL.

Witnesses:
J. W. SEE,
WM. S. GIFFEN.